United States Patent
Van Leeuwen

[15] 3,638,963
[45] Feb. 1, 1972

[54] SPRING SYSTEM

[72] Inventor: Gerrit Hendrik Van Leeuwen, Soesterenweg 2-4, Soestdijk, Netherlands

[22] Filed: Dec. 2, 1969

[21] Appl. No.: 888,199

[30] Foreign Application Priority Data

Dec. 3, 1968 Netherlands..........................6817259

[52] U.S. Cl................................................280/124, 267/20
[51] Int. Cl................................................................B60g 3/00
[58] Field of Search.............................267/20 A; 280/124

[56] References Cited

UNITED STATES PATENTS

| | | | |
|---|---|---|---|
| 2,087,299 | 7/1937 | Pribil | 267/20 A |
| 2,113,382 | 4/1938 | Oppenheimer | 267/20 A |
| 2,886,312 | 5/1959 | Freiermuth | 267/20 A |

*Primary Examiner*—Philip Goodman
*Attorney*—Marechal, Biebel, French & Bugg

[57] ABSTRACT

A spring suspension system comprises a first spring device and a spring arm adapted to turn about a pivot or a pivotal line of the spring-supported mass, and a second spring device connected between the spring arm and the spring-supported mass, the second spring device being capable of preferential action with respect to the first spring device.

8 Claims, 8 Drawing Figures

INVENTOR
GERRIT HENDRIK VAN LEEUWEN

SPRING SYSTEM

BACKGROUND OF THE INVENTION

Spring systems known and frequently employed in the construction of cars and motorcycles often have the disadvantage that they cannot be constructed so that they satisfy both and the requirements of road stability and those of a satisfactory spring comfort. A very flexible single spring system, which is ideal from the viewpoint of satisfactory traveling comfort, has the disadvantage that in riding across fairly large unevennesses of the road the wheels jump up or hop excessively so that the adhesion to the road is reduced and the road stability becomes insufficient.

SUMMARY OF THE INVENTION

These disadvantages can be avoided by the spring system according to the invention which is characterized by a spring arm provided with a second spring member bearing on the movable object with respect to which the moving mass has to be spring supported and on the spring arm, the construction being such that the springs of the second spring member can be preferentially compressed.

A spring system in accordance with the invention employed with a vehicle is capable of neutralizing substantially completely the small unevennesses of the road by means of the flexible second spring device, while in riding across bumps and potholes the first spring device will take over the action of the second spring device, which is then compressed substantially completely.

According to the invention springs of the two spring devices can structurally be arranged on one side or on both sides of the pivotal line. The spring system can be carried into effect by means of a great variety of spring elements, such as helical springs, torsional springs, compressed air springs, permanent-magnet and/or electromagnet springs or combination of these types of springs. The supporting point(s) of the pivotal connection of the spring arm of the first spring device may itself (themselves) be resiliently fastened to the spring-supported mass. In such an embodiment the resilient properties of the spring system are further improved.

In embodiments employed as vehicle springs the second spring device comprises preferably a spring arm which is pivotally connected with the spring arm of the first spring device. The stub shaft for journaling the vehicle wheel can then be secured to said second spring arm.

DESCRIPTION OF PREFERRED EMBODIMENTS

Figure 1:
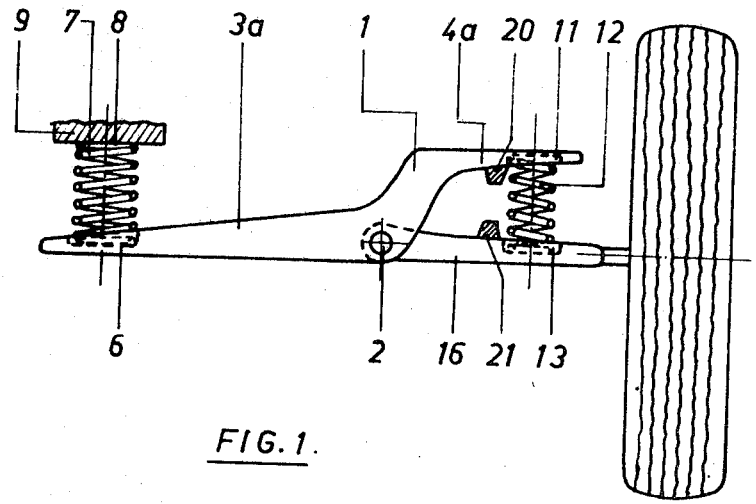
FIG. 1 is a side elevation of a spring system in accordance with the invention used in a vehicle.
Figure 2:
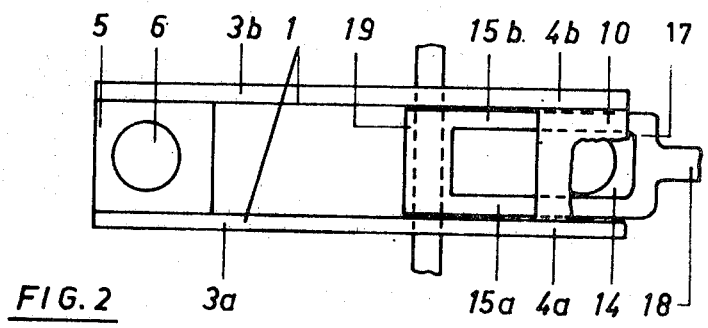
FIG. 2 is a plan view of the spring system of FIG. 1, a few elements being omitted for the sake of clarity.

The embodiment of the spring system shown in FIGS. 1 and 2, which is particularly suitable for use on a vehicle, comprises mainly an arm 1 capable of pivoting about a spindle 2 supported from some appropriate member of the vehicle chassis. The arm 1 is formed by two identical S-shaped profiles, the limbs 3a and 4a, 3b and 4b respectively of which extend approximately parallel to each other. Near the end of the arm 1 facing the interior of the vehicle, a plate 5 is welded between the two limbs 3a and 3b, to which plate a spring cup 6 is fastened, in which a helical spring 7 is connected or secured, the other end of which is fastened in a spring cup 8 secured to a suitable member 9 of the vehicle frame. At the other end of the arm 1, on the side of the wheels, a plate 10 is welded between the limbs 4a and 4b, said plate having secured to it a spring cup 11 holding a spring 12, the other end of which is held in a spring cup 13, supported from a plate 14.

The plate 14 is welded between the opposite members 15a and 15b of an arm 16, which are connected on the wheel side with a transverse piece 17, which is provided with a stub shaft 18 for journaling the wheel. On the opposite side the two members 15a and 15b terminate in a sleeve 19 adapted to rotate on the stub shaft 2. The plate 10 is furthermore provided with a rubber abutment 20 and the plate 14 has a similar rubber abutment 21, which can butt against each other so that they restrict the compressibility of the spring 12.

The springs are constructed to have such a flexibility as a function of the lengths of the respective arms 3a, 3b and 16 with respect to the spindle 2 that the spring 12 is preferentially compressed. This means that when absorbing slight shocks produced by unevennesses of small difference in height, for example the difference in height of the individual stones of a road, practically only the spring 12 will be operative, whereas the spring 7 is mainly reserved for action in the event of larger unevennesses of the road such as bumps, potholes, etc.

The invention provides the great advantage that it is not necessary to be satisfied by a compromise between a hard and a soft spring action, which means in practice a compromise between road stability and comfort, since the action of the spring portion of high flexibility (spring 12 and spring arm 16) is restricted to absorbing the small unevennesses of the road, whereas in absorbing heavier shocks, in which case too flexible a spring system of the known constructions gives rise to excessive jolting of the wheels and hence a reduced adhesion of the tires to the road cover, the spring 7 is extended or compressed, which spring 7 is less flexible so that jumping of the wheels can be avoided.

As a matter of course, the two springs 7 and 12 may be provided with shock absorbers. In accordance with the required spring characteristics and the structural requirements other springs then helical springs may be employed. A few further possibilities are described more fully hereinafter.

Figure 3:
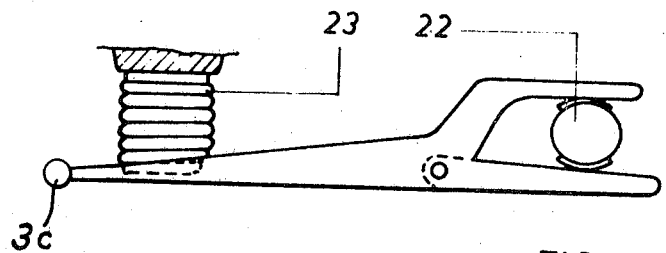
FIG. 3 shows a further embodiment of a spring system in accordance with the invention in a side elevation.

The embodiment shown in FIG. 3 is analogous to the embodiment shown in FIGS. 1 and 2; but the longer arm is pivoted to the chassis at 3a. The helical spring 12 is replaced by a rubber ball 22 and the helical spring 7 in this embodiment is surrounded by a rubber bellows 23 and constructed as a combined air-helical spring. This embodiment has the advantage that by varying the gas pressure in the bellows 23 the spring system can be readily adapted to different loads without adversely affecting the flexibility of the other spring element (in this embodiment the rubber ball 22).

Instead of the aforesaid combinations other possibilities are provided. For example, the springs 7 and/or 12 may be combined with or replaced by magnetic spring systems comprising permanent and/or electromagnets. Like the air springs or the combined helix-air springs the latter have the advantage that the spring action can be adapted to the load, but with respect to the latter system an electromagnetic spring system has the advantage that it is less sensitive to disturbances.

Figure 4:
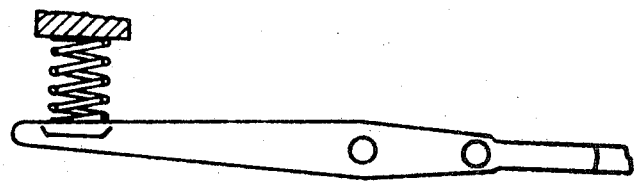
FIG. 4 is a side elevation of a still further embodiment of a spring system in accordance with the invention, in which a torsional spring is employed.
Figure 5:
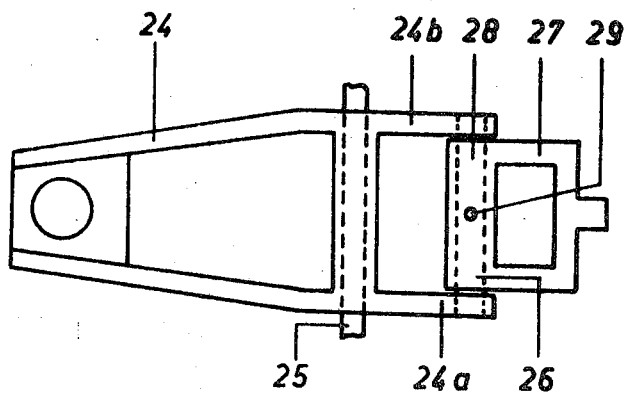
FIG. 5 is a plan view of the spring system shown in FIG. 4.

The embodiment of the invention shown in FIGS. 4 and 5 comprises a first arm 24, which together with the associated spring element on the left-hand side of the spindle 25 is constructed approximately in the same manner as in the first embodiment. On the right-hand side of the spindle the arm 24 is prolonged in the horizontal direction in contrast to the preceding embodiments. Between the ends of the opposite parts 24a and 24b a torsional rod 26 is secured, on which an arm 27 with its sleeve 28 is adapted to rotate. The sleeve 28 is rigidly secured by a pin 29 to the torsional rod 26 at the center.

Figure 6:
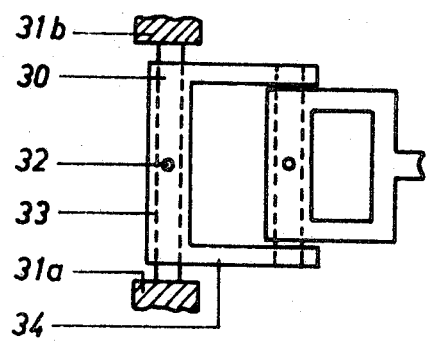
FIG. 6 shows an embodiment of a spring system in accordance with the invention comprising two torsional springs.

According to the invention the two spring elements may, as an alternative, be located on the same side of the spindle or the pivotal point of the arm and when torsional springs are employed, the spindle itself may be replaced by a torsional rod. Such an embodiment is shown in FIG. 6. This embodiment can be derived directly from the embodiment shown in FIGS. 4 and 5 by omitting the left-hand part of the spring system beyond the spindle 25 and by replacing the spindle by a torsional rod 30, the ends of which are rigidly secured in supporting members 31a and 31b shown schematically and which is fastened at the center by a pin 32 to the sleeves 33 of the arm 34.

Figure 7:
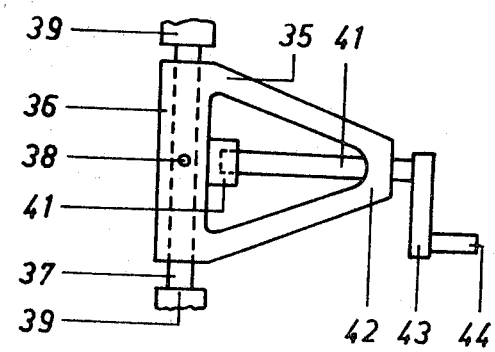
FIG. 7 shows an embodiment of a spring system in accordance with the invention comprising two orthogonal torsional springs.

In the embodiments described in the foregoing the spring system is invariably composed of two arms having two parallel pivotal axes. It is, however, not at all required for these two pivotal axes to extend parallel to each other. FIG. 7 shows an embodiment comprising tow torsional springs crossing each other at right angles. A first triangular pivotal arm 33 is fastened by a sleeve 36 to a torsional spring 37, which is rigidly secured by a pin 38 at the center to the sleeve 36. The torsional spring 37 is rigidly secured by its two ends in two fastening members 39, which are rigidly secured to the chassis of the vehicle. The triangular pivotal arm 35 has a projecting part 40 on the sleeve 36, in which part a second torsional spring 41 is secured and which is adapted to turn in a bearing 42, which is secured in a bore provided at the corner of the triangular arm 35. The end of the torsional spring 41 projecting from the corner of the triangular arm 35 is provided with a transverse element 43, on which a stub shaft 44 for journaling the wheel is arranged.

Figure 8:
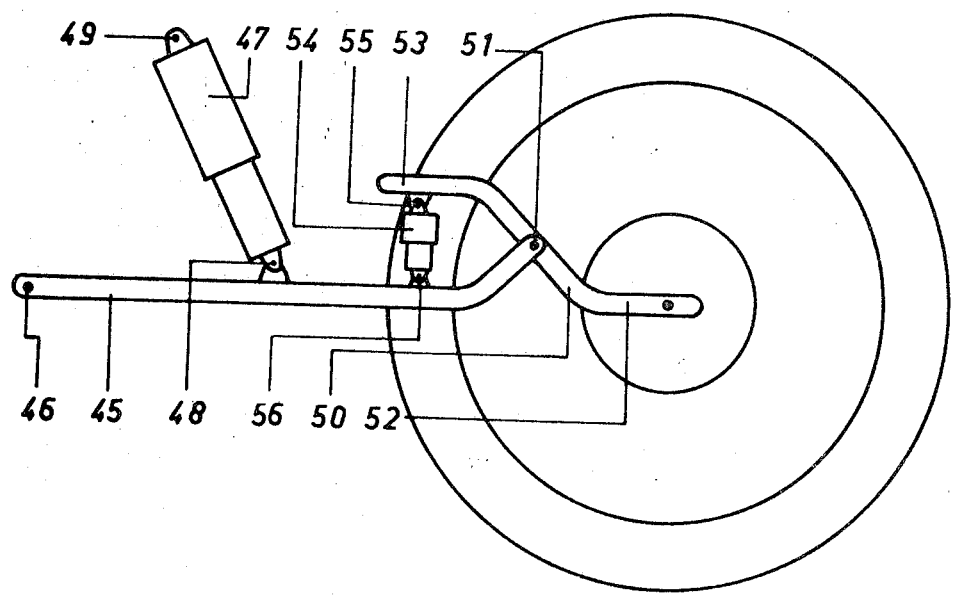
FIG. 8 shows a further embodiment of a spring system in accordance with the invention employed on a motorcycle.

FIG. 8 shows a further embodiment of the invention used on a motorcycle, in which the two springs are located on the same side of the pivotal point of the arm. This embodiment comprises a first arm 45 having a pivotal point 46, located near the engine block of the motorcycle. The arm 45 is supported from a spring 47 pivotally secured to the arm 45 and pivotally secured at 49 to the frame of the motorcycle. The arm 45 is bent over upwardly at its end near the rear wheel and is provided with a pivotal arm 50, which is secured at the pivotal point 51. The arm 50 has approximately the shape of an inverted S having two parts 52 and 53 extending parallel to the arm 45. The rear wheel is journaled in the arm portion 52 at the end. Between the arm portion 53 and the arm 45 a second spring 54 is arranged, which is fastened at a pivotal point 55 to the arm portion 53 and at a pivotal point 56 to the arm 45.

While the forms of apparatus herein described constitute preferred embodiments of the invention, it is to be understood that this invention is not limited to these precise forms of apparatus and that changes may be made therein without departing from the scope of the invention.

What is claimed is:

1. A spring suspension system for a vehicle having a chassis and a connected mass such as a wheel assembly, comprising
   a first suspension arm having a pivot point connection to the chassis,
   a first spring device acting between said first suspension arm and said chassis,
   a second suspension arm pivotally connected at one of its ends to said first suspension arm and providing a movable support for the mass at the other of its ends,
   and a second spring device acting between said first arm and said second arm,
   said second spring device being constructed and arranged for preferential action with respect to said first spring device whereby lesser movements of the mass are absorbed by the second spring device alone, and greater movements are resisted by the second spring device and then the first spring device.

2. A spring system as claimed in claim 1, characterized in that the springs of the two spring devices are arranged on the same side relatively to the pivotal point of said first arm.

3. A spring system as claimed in claim 1 characterized in that the springs of the two spring devices are arranged on different sides of the pivotal point of said first arm.

4. A spring system as claimed in claim 1 characterized in that the second suspension arm is secured to a torsional spring which constitutes the second spring device and which forms the pivot connection between said arms.

5. A spring system as claimed in claim 1 characterized in that the second suspension arm is hinged to said first suspension arm at said pivotal point of said first arm.

6. A spring system as claimed in claim 1 characterized in that the pivot axes of the two suspension arms are spaced apart and extend parallel to each other.

7. A spring system as claimed in claim 1 characterized in that the pivot axes of the two suspension arms are arranged at an angle to each other.

8. A spring system as claimed in claim 1 characterized in that the pivotal lines of the two suspension arms are crossing each other.

* * * * *